United States Patent [19]
Guerini

[11] 3,860,905
[45] Jan. 14, 1975

[54] SPEED INDICATOR AND SPEED SIGNALLING DEVICE FOR VEHICLES IN GENERAL

[76] Inventor: Mario Guerini, Via Cappuccini, 14, Milan, Italy

[22] Filed: July 3, 1973

[21] Appl. No.: 376,116

[30] Foreign Application Priority Data
July 5, 1972  Italy................................ 26655
Mar. 5, 1973  Italy................................ 21170

[52] U.S. Cl..................... 340/62, 340/263, 180/106
[51] Int. Cl............................................. B60q 1/54
[58] Field of Search..................... 340/62, 53, 263; 180/105 R, 105 E, 106

[56] References Cited
UNITED STATES PATENTS
2,251,623  8/1941  Crofoot et al.................. 340/62 UX

*Primary Examiner*—Alvin H. Waring
*Attorney, Agent, or Firm*—Bacon & Thomas

[57] ABSTRACT

A speed indicator and speed signalling device for vehicles comprising a centrifugal governor carried by a pivoting or rotating shaft connected to a vehicle drive; the centrifugal governor acts to actuate an electric contact slider provided with two contact elements aligned in the direction of the slider movement in order to complete the electric circuit of electric lamps having different signalling characteristics.

4 Claims, 9 Drawing Figures

PATENTED JAN 14 1975 3,860,905
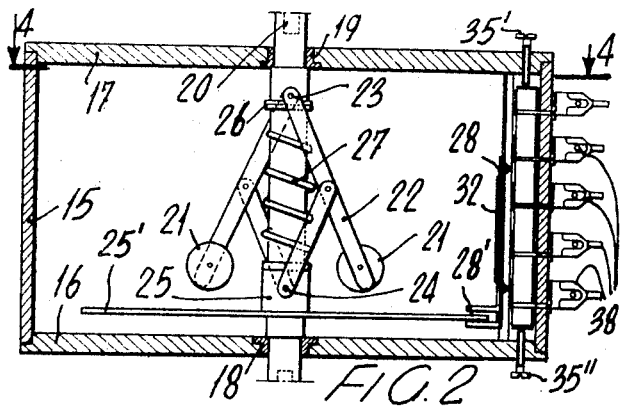
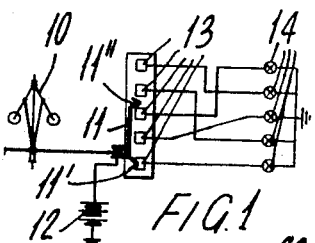
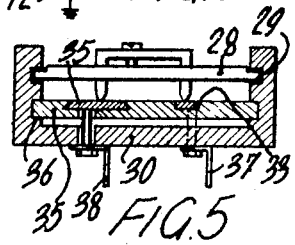
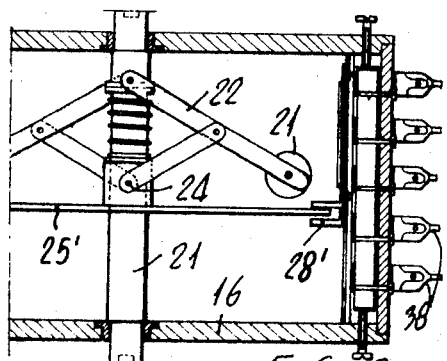
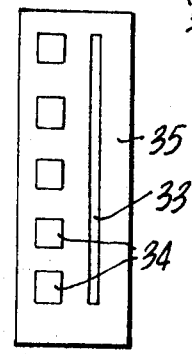
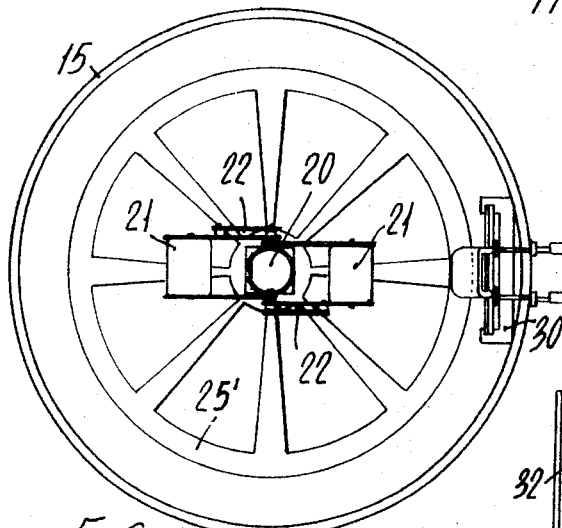
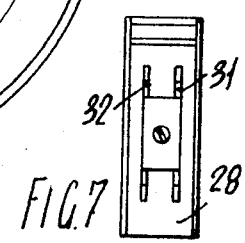
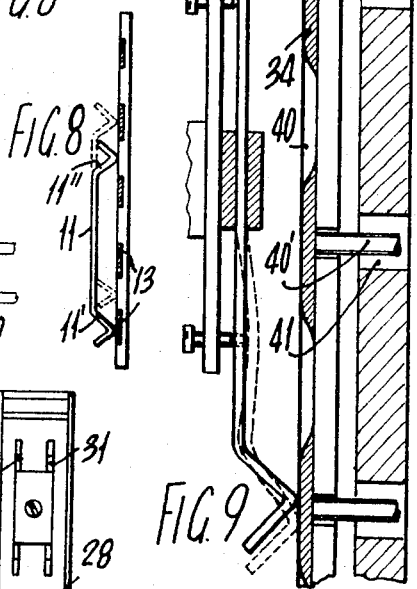

SPEED INDICATOR AND SPEED SIGNALLING DEVICE FOR VEHICLES IN GENERAL

The present invention refers to a speed indicator and a speed signalling device of a generic vehicle of land-, air- and water type, as for example cars, motovehicles, trains, ships, aeroplanes or the like.

In particular, the invention relates to a speed indicator device for a vehicle adapted to give light signals of different colours, so that each coloured light signals, outside or inside the vehicle, corresponds to a predetermined speed value or range.

The object of the invention is to provide an indicator, signalling device as above mentioned, which is of simple construction, sure operation and that permits to maintain the encumbrances at a minimum, thanks to a particular conformation and setting of the component parts.

Another object of the present invention is to provide a device as above described, which permits carrying out, in an easy way, any operation of calibration or setting and adjusting of speed values for which the device supplies the corresponding coloured signals.

In general, an indicator and signalling device for vehicle speed, according to the invention, is characterized by the fact that it comprises, in combination, a housing or case, a shaft supported and rotating in said case and connected to a drive of the vehicle, a centrifugal governor supported by said shaft for rotating therewith, a signalling unit comprising electric lamps having different signal characteristics, each corresponding to different values of the vehicle speed, said lamps being connectable to an electric power source through an electric connecting device having electric stationary contacts each electrically connected to a corresponding lamp of said set of lamps and a mobile slider or cursor with an electric contact element connected to the said energy source, the slider being furthermore operatively connected to a disc supported, rotating and mobile along said shaft, by said centrifugal governor for a forwards and backwards sliding movement according to the variations of the vehicle speed; said electric contact element of the slider presenting two contact points aligned with said stationary contacts and disposed in such a way that, by the slider movement according to the speed variations, the electric supply circuit of said lamps is completed alternatively through one or the other of said contact points of said slider for feeding the respective lamps in succession and according to the speed variations of the vehicle.

According to another characteristic of the device of the invention, said stationary contacts and contact points of the mobile slider are adjustable in position in relation to each other in order to permit a perfect calibration of the device according to the needs.

These characteristics and others of the invention will be much more evident from the following description, with reference to the annexed drawings, in which:

FIG. 1 is the electric scheme of the speed indicator according to the invention;

FIG. 2 is a longitudinal section view of the speed governor and the associated electric contact parts, in one operating condition;

FIG. 3 is a view similar to that of FIG. 2 but with the parts in another operating condition;

FIG. 4 is a cross-section substantially along line 4—4 of FIG. 2;

FIG. 5 is a cross-section view of the contact electric device controlled by the centrifugal governor;

FIG. 6 is a plan view for the support means for the stationary electric contacts;

FIG. 7 is a plan view for the support slider for the mobile or sliding electric contacts;

FIG. 8 is a diagramatic view of the contact device for indicating the different positions in the contact points of the slider;

FIG. 9 is an enlarged longitudinal section of the contact electric device to show some of the possible ways for adjusting the relative position of the contacts.

FIG. 1 shows a general scheme of the indicator and signalling device according to the invention, which substantially comprises a device sensitive to the speed indicated in its whole by 10, for instance constituted by a centrifugal governor, as better illustrated in the other figures, which is connected to a drive of a vehicle (not represented) and drags along a contact slider schematically represented by 11, suitably connected to the positive pole of a source 12 of electric energy, such as a battery of a car, having the negative pole connected to the vehicle ground. Stationary contacts 13 are suitably connected to a corresponding set of electric lamps 14, in their turn connected to ground, so that the circuit of each electric lamp is completed starting from the electric energy source 12, through slider 11, relative stationary contact 13, lamp 14 itself and the ground. Lamps 14 are located inside the vehicle and/or outside thereof in easily visible positions in front, in rear and at both sides of the vehicle itself.

Therefore, according to the speed and hence the location governor 10, as of the well as of the contact slider 11, one of said lamps 14 will be turned on. Giving to each lamp different signalling characteristics, for example a different color, it will be possible to obtain just as many different speed signallings, each corresponding to a value or a predetermined value range.

As it is shown in FIG. 1, in order to reduce to a minimum the overall dimensions of the device and to simplify its construction, the slider 11 or relative contact element is provided with two contact points 11' and 11" spaced from each other in the direction of the slider movement, a distance equal to or greater than the greatest distance existing between two or more successive stationary contacts, so that alternatively one or the other of the contact points 11' and 11" of the slider are in register with one of the stationary contacts 13, above mentioned. In the example of FIG. 1, as it can be seen, the distance between the contact points 11' and 11" of the slider is greater than distance between the successive stationary contacts, assuming these latter to be uniformly spaced from each other. Therefore, while for example, contact point 11' engages the lower stationary contact FIG. 1, contact point 11" is in an intermediate position between the third and the forth stationary contacts.

This particular constructive solution of the shown electric contact device permits a remarkable reduction of the overall dimensions still giving always the possibility of lighting, in succession, lamps 14 starting for instance, from the bottom to the top, when the vehicle speed varies and more precisely encreases; in fact, in doing so, dead points do not exist during the slider stroke, so it can be kept at a minimum, by reducing at the same time the stroke and then the overall dimension of the centrifugal governor.

Of course, in order to obtain the successive and regular lighting of the lamps starting from the bottom to the top, the connections with the stationary contacts 13 of the electric contact device must be suitably arranged as shown in FIG. 1.

By considering FIG. 1 and FIG. 8 of the annexed drawings, in fact, it can be seen how contact point 11', departing from the position of FIG. 1, completes the feeding electric circuit of the first lamp 14 at the bottom of FIG. 1, then for a short displacement towards the top of the slider, how contact point 11' moving into register with the forth stationary contact 13 (always starting from the bottom of FIG. 1), completes the feeding electric circuit of the second lamp 14 (starting from the bottom) and so on and on for the remaining parts. In general it can be said that in the diagram of FIG. 1, contact point 11' serves to complete the electric points of lamps 14, placed in odd position while contact point 11'' serves to complete the feeding electric circuit of lamps 14 placed in even position.

With reference to FIGS. 2 to 7, a constructive embodiment of the device according to the invention will now be described.

FIG. 2 shows a circular case 15 closed at the bottom by a bottom end 16 and respectively at the top by a cover 17, which are provided with bearings or bushings 18, 19 for supporting a rotating shaft 20, one end of which at least can protrude from case 15 to connect to a suitable drive of the vehicle on which the device is located.

Inside case 15, and connected to shaft 20 for revolving therewith, there is a conventional centrifugal governor device (indicated in its whole by 10 in FIG. 1) of the type having centrifugal masses 21 connected to the respective lever arms 22, constituting in its whole an articulated quadrilateral linkage pivoted at 23 to shaft 20 about an axis perpendicular to shaft 20 and articulated at 24 on a sleeve 25, sliding along shaft 20. Between a lower sleeve 25 and an upper stop 26 an helicoidal spring 27 is wound on shaft 20, as shown in FIG. 2.

A disc or circular element 25' is fastened to sleeve 25 of the centrifugal governor, the outer rim of said disc can slide in a seat 28' of a sliding plate 28, of electrically insulating material, constituting part of a contact slider of the electric circuit, diagramatically indicated by 11 in FIG. 1. Plate 28 slides in the longitudinal guides 29 (FIG. 5) formed inside the sides of an insulating support 30, located inside said case 15. In this manner, plate 28 of the slider can be drawn toward the top or the bottom by the centrifugal governor, assuming a relative position, which is a function of the vehicle speed on which the device is located.

Mobile plate 28 of the slider carries a first electric contact element 31 and a second electric contact element 32, which, in the diagram of FIG. 1, corresponds substantially to the contact element 11.

The electric contact elements 31, 32 electrically connected to each other are located laterally, or side by side, at a distance substantially equal to the distances which are between a continuous contact stripe 33 and a plurality of stationary contacts 34 formed or fixed on an insulating base 35, carried by the cited support 30 (the stationary contacts 34 of FIG. 6 correspond substantially to the stationary contacts 13 of FIG. 1). Base 35 is slidable in longitudinal guides 36 of support 30 and can be fixed at the desired position by acting on adjusting screws 35' and 35''.

Contact stripe 33 is connectable, through its own terminal 37, to an electric feeding source and correspondently the stationary contacts 34 are connectable through corresponding terminals 38 to speed indicating and signalling lamps 14 in FIG. 1, in their turn connected to the ground.

As already said for the slider 11 of FIG. 1, contact element 32 to engage the stationary contacts 34 is of the double type, having two contact points, correspondently contact element 32 has been similarly shaped for a better equilibrium of the slider, without this being really necessary.

By comparing FIGS. 2 and 3 of the annexed drawings, it can be seen that by changing the vehicle speed when the centrifugal governor moves from its position, for example of FIG. 2, to the position, for example of FIG. 3, the contact slider moves correspondently from its lower position to an upper position to close the electric circuit of the signalling lamp which corresponds to that determined value or value range of the vehicle speed.

Base 35 of stationary contacts is carried sliding in guides 36 of said support 30 and it is maintained stationary in a predetermined position, for instance, by an upper adjusting screw 35 and a lower adjusting screw 35''.

This system is particularly useful when it is necessary to adjust the device for changing the speed values for which the indicator provides the signallings. Of course, by moving base 35, the relative distance between the different stationary contacts 34 remains unchanged, the ratios between the values of the signalled different speeds or speed ranges remain unchanged and they will simply all move towards higher or lower values, according to the needs.

If it is desired to vary the relative ratios between the different speeds or speed ranges, it is possible to procede in two ways: namely either by varying the relative positions between the stationary contacts or by varying the distance between the two corresponding contact points of the slider.

Both solutions are diagramatically represented in the enlarged section of FIG. 9.

In FIG. 9 an enlarged longitudinal section is shown, corresponding to the described contact device, some parts of the structure having been eliminated from the drawing for a better understanding. In FIG. 9 the unchanged parts are indicated with the same reference numbers of the preceding figures.

As said above, a first adjustment way can be obtained by varying the mutual positions of stationary contacts 30. For this purpose and only by way of example, stationary contacts 30 have been located with the possibility of a short displacement along a guide 40, formed longitudinally to base 35 and providing a suitable hole 41 elongated and ovalized in the displacement direction of contact 34, on the rear wall of said support 30; through these holes 41 pass the corresponding threaded locking stems 40' of contacts and which serve, at the same time as connections with the outer electric circuit.

A second adjusting possibility can be carried out by flexing or bending lightly one or both arms of contact element 11, for example, by means of suitable pushing screws 42 carried by the slider, so that the contact points 11' and 11'' can be moved apart and approached to each other, as shown by a short dashed line for the contact point 11' in FIG. 9.

In this way, it is possible to standardize the construction of the device by adapting and adjusting it everytime according to the different needs.

I claim:

1. A speed indicator and speed signalling device for a vehicle, characterized by the fact that it comprises, in combination: a rotating supported shaft adapted to be connected to a vehicle drive, a centrifugal governor supported by said shaft for rotation therewith, a signalling unit comprising electric lamps having different signalling characteristics, each one corresponding to a different value of vehicle speed, said lamps being connectable to an electric energy source through an electrical contact device, comprising stationary contacts spaced apart in a direction generally parallel to said shaft, each of said contacts being electrically connected to one of said lamps, and a mobile slider having electric contact elements connected to said energy source, said slider being operatively connected to said centrifugal governor for sliding movement therewith in the direction of said shaft, according to variations in the vehicle speed, said electric contact elements of the slider comprising two spaced contact members aligned in the direction of the reciprocating motion of the slider, with a distance between them substantially equal to the distance between the trailing edge of one of the fixed contacts and the leading edge of another of the fixed contacts, whereby, by the slider movement, when the vehicle speed varies, the electric feeding circuit of said lamps is completed, alternatively through one and the other of the contact members of the slider.

2. The device of claim 1, wherein the whole assembly of the fixed contacts is movable as a unit for adjustment in the direction of the reciprocating slider movements.

3. The device of claim 1, wherein the position of both the contact members of the slider are independently adjustable relative to said slider in the direction of the reciprocating slider movement.

4. The device of claim 1, wherein means are provided for adjusting the spacing of said fixed contacts in relation to each other.

* * * * *